(12) United States Patent
Um

(10) Patent No.: US 8,765,283 B2
(45) Date of Patent: Jul. 1, 2014

(54) CONDUCTIVE TAB AND BATTERY PACK HAVING THE SAME

(75) Inventor: Miae Um, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1406 days.

(21) Appl. No.: 12/230,627

(22) Filed: Sep. 2, 2008

(65) Prior Publication Data

US 2009/0104513 A1 Apr. 23, 2009

(30) Foreign Application Priority Data

Aug. 31, 2007 (KR) .................. 10-2007-0088565

(51) Int. Cl.
- *H01M 2/26* (2006.01)
- *H01M 2/28* (2006.01)
- *H01M 2/24* (2006.01)
- *H01M 6/42* (2006.01)
- *H01M 6/12* (2006.01)
- *H01M 6/46* (2006.01)

(52) U.S. Cl.
USPC ........... 429/121; 429/158; 429/159; 429/161; 429/162

(58) Field of Classification Search
USPC .................. 429/159, 158, 162, 121, 161
See application file for complete search history.

(56) References Cited

U.S. PATENT DOCUMENTS 7,479,346 B1 * 1/2009 Chow et al. .................. 429/158

FOREIGN PATENT DOCUMENTS

| JP | 2001057192 | * | 2/2001 | |
| JP | 2001057192 A | * | 2/2001 | .............. H01M 2/10 |
| JP | 2002-231214 | | 8/2002 | |
| JP | 2004152706 A | * | 3/2004 | .............. H01M 2/10 |
| JP | 2004-152706 | | 5/2004 | |
| JP | 2005-011629 | | 1/2005 | |
| JP | 2006-294524 | | 10/2006 | |
| JP | 2007-059329 | | 3/2007 | |
| KR | 1020030038834 | | 5/2003 | |

OTHER PUBLICATIONS

The Random House College Dictionary (The Random House College Dictionary Revised Edition, Ed. Stein, © 1980 Random House Inc. New York p. 1102, "recess" col. 1, per definition 5).*

* cited by examiner

*Primary Examiner* — Patrick Ryan
*Assistant Examiner* — Aaron Greso
(74) *Attorney, Agent, or Firm* — Robert E. Bushnell, Esq.

(57) ABSTRACT

A conductive tab includes a battery connecting part contacting a plurality of secondary batteries, a wire connecting part extended from the battery connecting part and connected to a wire, and at least one bending part formed in the battery connecting part. The bending part is coupled to the secondary battery to guide the positions of the secondary batteries. The conductive tab can be exactly welded at a predetermined position of the secondary battery, and prevents conductive tabs from closely adhering to each other during a welding process.

15 Claims, 7 Drawing Sheets

CONDUCTIVE TAB AND BATTERY PACK HAVING THE SAME

CLAIM OF PRIORITY

This application makes reference to, incorporates the same herein, and claims all benefits accruing under 35 U.S.C. §119 from an application earlier filed in the Korean Intellectual Property Office on 31 Aug. 2007 and there duly assigned Serial No. 10-2007-0088565.

BACKGROUND OF THE INVENTION

1. Field of the Invention

The present invention relates to a conductive tab and a battery pack having the same, and more specifically to a conductive tab capable of being exactly welded at a predetermined position of a secondary batter and being not closely welded to each other and a battery pack having the same.

2. Description of the Related Art

Generally, only one secondary battery is not enough as a power source to a notebook PC, a personal portable terminal and the like. Accordingly, a power supply apparatus used in such a notebook PC or the like is in the form of a plurality of secondary batteries connected in series or in parallel so as to obtain desirable voltage and electric capacity. Herein, a configuration, in which a protective circuit module is electrically connected to the plurality of secondary batteries and then is received in a case, is the so-called battery pack.

A conductive tab is usually used as a member to connect a plurality of secondary batteries in series or in parallel as mentioned above. For example, such a conductive tab is comprises of a battery connecting part in a rectangular plate type and a wire connecting part bent from the battery connecting part. The battery connecting part of the conductive tap is welded to all the same electrodes such as positive electrodes or negative electrodes, so that a plurality of secondary batteries is connected in parallel. Also, the battery connecting part of the conductive tap is welded to the opposite polarity of the secondary batteries, so that a plurality of secondary batteries is connected in series. In addition, the wire connecting part of the conductive tab is bent in a perpendicular direction to the battery connecting part, and then on the surface thereof, a power wire for drawing out power or a sensing wire for sensing voltage is soldered.

In the welding process, a plurality of secondary batteries is aligned and then a conductive tap in a plate type is temporarily contacted with one side portion thereof. After that, the conductive tab is welded electrically and mechanically to the secondary batteries by a resistance welding or a laser welding method.

However, in the welding process, the position of the conductive tab is easily changed in the secondary batteries. In other words, the position of the conductive tab may be changed while the conductive tab temporarily contacts to the secondary batteries before the welding process and/or by a contact with a welding rod during the welding process. Therefore, the different positions of the conductive tab to contact secondary batteries make it difficult to solder the power wire or sensing wire later. In some cases, a short circuit with an unwanted area may be incurred.

Meanwhile, conventional conductive tabs are kept in laminated state. However, the conductive tabs that are laminated and kept sometimes strongly adhere to each other by oil used for blanking during the manufacturing process of the conductive tabs or by moisture remained after a washing process. Therefore, it is frequent that a plurality of conductive tabs closely adheres to each other and is welded to secondary batteries as their states are. In addition, since such conductive tabs are very thin, it is difficult for a worker or working equipment to notice whether the plurality of conductive tabs are closely adhered to each other, thus it often causes a defective welding and soldering. In other words, a battery connecting part of each conductive tab should be welded to secondary batteries, and a wire should be soldered to a wire connecting part thereof. However, when several conductive tabs closely adhere together and are welded, the welding conductive tabs and the secondary batteries cannot be strongly welded due to the resistance. Beside, if the conductive tabs welded in this state are soldered, electrical connection strength between the wire and the secondary battery is naturally weaken.

SUMMARY OF THE INVENTION

The present invention has been contrived to solve the problems. It is an aspect of the present invention to provide a conductive tab capable of being exactly welded at a predetermined position of a secondary battery, and a battery pack having the same.

It is another aspect of the present invention to provide a conductive tab capable of preventing a plurality of conductive tabs from being closely adhered to each other and welded to the secondary battery as they are, and a battery pack having the same.

In order to accomplish the aspects, a conductive tab according to the present invention includes a battery connecting part contacting a plurality of secondary batteries, a wire connecting part extended from the battery connecting part and connected to a wire, and at least one bending part formed in the battery connecting part. The bending part is coupled to the secondary batteries to guide the positions of the secondary batteries.

Herein, the bending parts are coupled to a gap formed between secondary batteries. One bending part may be formed in an upper portion of the battery connecting part, and another bending part may be symmetrically formed in a lower portion of the battery connecting part.

The bending part may include a bottom portion coupled to a gap between the secondary batteries, and a side portion connecting the bottom portion to the battery connecting part. The battery connecting part and the bottom portion may be formed on different surface levels from each other. The side portion may be obliquely connected to the battery connecting part, or may be connected to the battery connecting part substantially at a right angle. The side portion may have a shape that matches a shape of a corner portion of one of the secondary batteries.

At least one connection hole maybe formed on the battery connecting part in the corresponding region to the secondary battery. The battery connecting part and the secondary battery may be welded to each other via the connection hole. At least one wide hole may be formed on the battery connecting part in the corresponding region to the secondary battery so as to alleviate a thermal expansion phenomenon during the connecting process. The secondary batteries connected to the battery connecting part may include a cylindrical type battery or a square type battery.

In order to accomplish the aspects, a battery pack according to the present invention includes a plurality of secondary batteries, a conductive tab, a protective circuit module electrically connected to the wire, and a case receiving therein the secondary battery, the conductive tab, the wire and the protective circuit module. The conductive tab includes a battery connecting part contacting the second batteries, a wire connecting part extended from the battery connecting part and connected to a wire, and a bending part formed in the battery connecting part. The bending part is coupled to the secondary batteries to guide the positions of the secondary batteries.

As mentioned above, a bending part is further formed in the conductive tab so as to make the conductive tab coupled to the secondary battery at a predetermined position, so that the position of the conductive tab is fixed before or during the welding process. For example, since the bending part of the conductive tab is coupled and fixed to the gap between the secondary batteries, even though the conductive tab is contacted with the welding rod during the welding process, it does not easily move. Accordingly, the conductive tab is always exactly welded at the desirable position of the secondary battery.

In addition, since the bending part is further formed in the conductive tab, although a plurality of conductive tabs are kept in a laminated state, a predetermined gap is formed between the conductive tab and the conductive tab due to the bending part. In other words, the conductive tabs do not closely adhere to each other by oil or moisture used for the manufacturing process due to the bending part. Therefore, it is possible for a worker or working equipment to exactly separate any one conductive tab of a plurality of conductive tabs, so that only one conductive tab can become connected to the secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

Hereinafter, the preferred embodiments of the present invention will be described with reference to the accompanying drawings.

Figure 1:
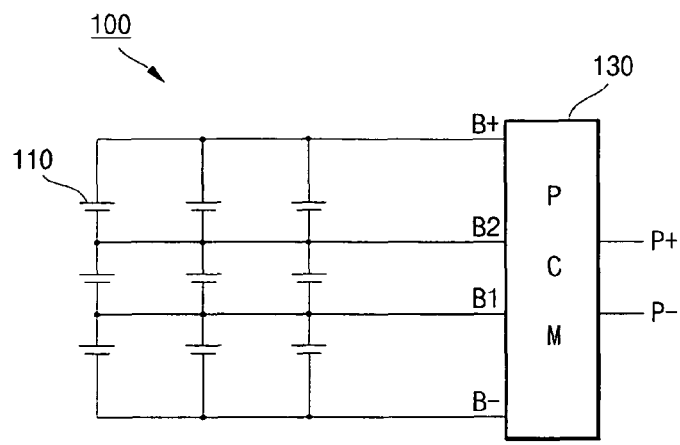
FIG. 1 is a schematic circuit view showing a circuit structure of a battery pack according to the present invention.
Figure 2:
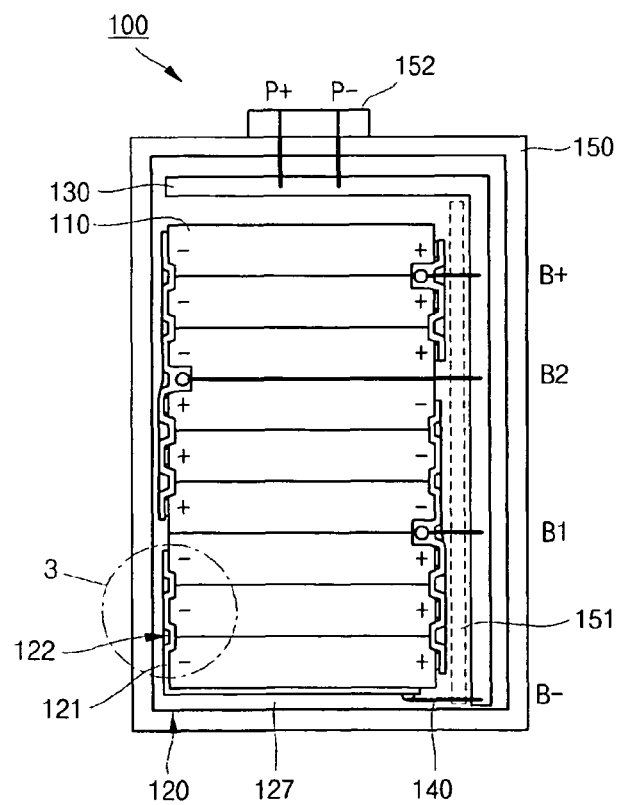
FIG. 2 is a schematic plan view showing a mechanical structure of a battery pack according to the present invention.

FIG. 1 is a schematic circuit view showing a circuit structure of a battery pack according to the present invention. FIG. 2 is a schematic plan view showing a mechanical structure of a battery pack according to the present invention.

As shown in FIG. 1 and FIG. 2, a battery pack 100 according to the present invention includes at least one secondary battery 110; at least one conductive tab 120 connecting the secondary battery 110 in series and parallel; a protective circuit module 130; at least one wire 140 electrically connecting the conductive tab 120 and the protective circuit module 130; and a case 150 receiving therein the secondary battery 110, the conductive tab 120, the protective circuit module 130, and the wire 140. Herein, a wall 151 may be further formed between the conductive tab and the protective circuit module 130 so as to prevent an unnecessary electrical short circuit between them.

The secondary battery 110 may be an ordinary rechargeable battery. As an example, the secondary battery 110 may be any one chosen from a group consisted of nickel-metal hydride battery, a lead battery, a lithium ion secondary battery and equivalents thereof, but the present invention is not limited to the kind of the secondary battery 110. In addition, the secondary battery 110 may be any one chosen from a group consisted of a cylindrical type battery, a square type battery, a pouch type battery, and equivalents thereof, but the present invention is not limited to the type of the secondary battery 110.

The conductive tab 120 connects a plurality of secondary batteries 110 in series or parallel. The conductive tab 120 includes a battery connecting part 121 directly contacting the secondary battery 110 and a wire connecting part 127 connected to a wire 140. Also, the battery connecting part 121 has further a bending part 122 formed to be coupled to the gap or the boundary region between the secondary batteries 110 so that the secondary batteries are guided to exact positions in the conductive tab 120. The conductive tab 120 may be made of any one chosen from a group consisted of nickel and equivalents thereof, which has high electrical conductivity and is easy for the welding and soldering processes, but not limited thereto. The conductive tab 120 will be more particularly described in the below.

The protective circuit module 130 may be installed on one side portion of the secondary battery 110. The protective circuit module 130 is electrically connected to the secondary battery 110, thereby preventing the secondary battery from being overcharged or over-discharged. To this end, the protective circuit module 130 may have a plurality of active elements and passive elements received therein. Although the protective circuit module 130 is shown as an approximately inverted "L" shape in FIG. 2, the present invention in not limited to the shape of the protective circuit module 130. For example, the protective circuit module 130 can be a rectangular plate or square plate.

The wire 140 electrically connects the secondary battery 110 to the protective circuit module 130. In other words, the wire 140 has one end soldered to the wire connecting part 127 of the conductive tab 120 and the other end soldered to the protective circuit module 130.

The case 150 receives the secondary battery 110, the conductive tab 120, the protective circuit module 130 and the wire 140, and protects them from the external environment. The case 150 may be made of an ordinary plastic resin, but not limited thereto. Furthermore, a pack terminal 152 electrically connected to the protective circuit module 130 may be further formed in the case. The pack terminal 152, as an example, is electrically connected to external equipments such as a notebook PC or a charger, thereby allowing the secondary battery 110 to be discharged or charged. Alternatively, the pack terminal 152 can be formed directly in the protective circuit module 130 other than the case 150.

"B−", "B1" and "B2", and "B+" in the FIGS. 1 and 2 respectively refer to the lowest voltage, sensing voltages, and the highest voltage of the secondary battery. Also, "P−" and "P+" in the FIGS. 1 and 2 respectively refer to the lowest voltage and the highest voltage of the pack terminal. In addition, "+" and "−" in the FIGS. 1 and 2 respectively refer to positive polarity and negative polarity of the second battery.

Figure 3:
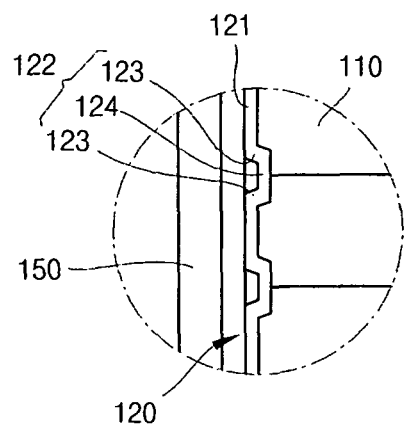
FIG. 3 is an enlarged view of region "3" of the FIG. 2.

FIG. 3 is an enlarged perspective view of portion "3" of the FIG. 2.

As shown in FIG. 3, a bending part 122 is formed in a region, corresponding of a battery connecting part 121 of a conductive tab 120, which is connected to a secondary battery 110, to gap or boundary between secondary batteries 110. The bending part 122 may be comprised of a pair of side portions 123 and a bottom portion 124 formed between the side portions 123.

Herein, the one pair of side portions 123 of the bending part 122 contacts the surfaces of the secondary batteries 110. In other words, the one pair of side portions 123 of the bending part 122 contacts the surface of the secondary batteries 110, respectively, and the bottom portion 124 is disposed in the gap or boundary between two of the secondary batteries 110.

Figure 4:
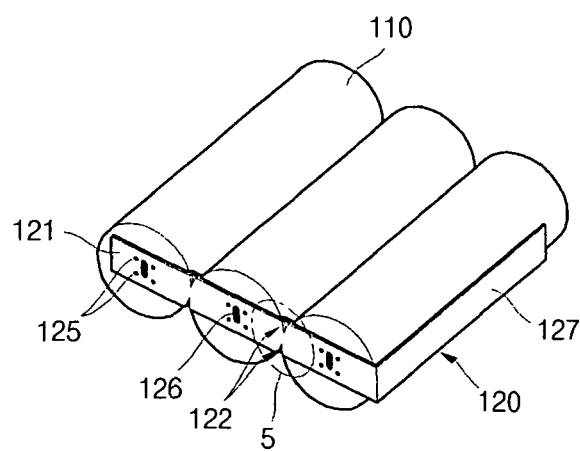
FIG. 4 is a perspective view showing a state where a conductive tab according to an embodiment of the present invention is connected to a cylindrical type battery.

FIG. 4 is a perspective view of a state where a conductive tab according to an embodiment of the present invention is connected to a cylindrical type battery.

As shown in FIG. 4, a conductive tab 120 is divided into a battery connecting part 121 connected to the secondary battery 110 and a wire connecting part 127 connected to a wire 140. In addition, the battery connecting part 121 and the wire connecting part 127 may be bent in a perpendicular direction to each other. Although the wire connecting part 127 is bent along the side portion of the secondary battery 110 in FIG. 4, it is possible for the wire connecting part 127 to be bent toward the upper portion of the secondary battery 110. The wire connecting part 127 may protrude and extend in an approximately perpendicular direction to the battery connecting part 121, rather than being the extension wire of the battery connecting part 121.

The conductive tab 120 may have a plurality of connection holes 125 formed in the battery connecting part 121, especially in the corresponding regions to the secondary batteries 110 so as to be connection reference points during the connecting process. For example, a welding rod is connected to the connection hole 125, so that the battery connecting part 121 and the secondary battery 110 are welded to each other. In this way, the conductive tab 120 according to the present invention has a welding region formed at the same position at all times.

Additionally, the conductive tab 120 may have wide holes 126 formed in the battery connecting part 121, especially in the corresponding regions to the secondary batteries 110 so as to alleviate a thermal expansion phenomenon during the connecting process. The wide holes 126 are usually larger than the connection holes 125, thereby minimizing the expansion phenomenon due to heat generated from the welding process. It is desirable for the long holes to be formed in the vicinity of the connection holes 125 which the welding is proceeded.

One bending part 122 may be formed in an upper portion of the battery connecting part 121, and another bending part 122 may be symmetrically formed in a lower portion of the battery connecting part 121. Accordingly, the bending part 122 is coupled to the gap or boundary region formed between the upper portions of the secondary battery 110 and the secondary battery 110, and the gap or boundary region formed between the lower portions of the secondary battery 110 and the secondary battery 110. As a result, when conductive tab 120 is connected to the secondary battery 110, it is not easily deviated to the outside portion by external force. The conductive tab 120 is strongly coupled to the secondary battery 110 before the welding process, so that the position is not changed by a contact with a welding rod in the subsequent welding process.

The secondary battery 110 connected to the conductive tab 120 is a cylindrical type in FIG. 4, but the present invention is not limited to the type of the battery.

Figure 5:
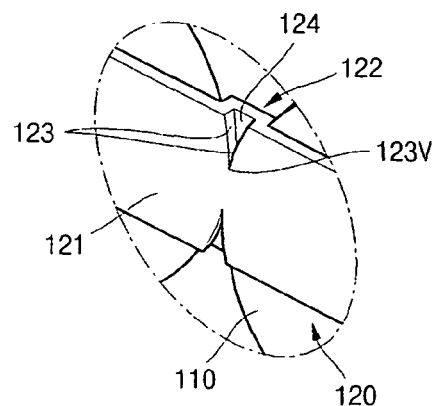
FIG. 5 is an enlarged perspective view of portion "5" of the FIG. 4.

FIG. 5 is an enlarged perspective view of portion "5" of the FIG. 4.

As shown in FIG. 5, a bending part 122 formed in a battery connecting part 121 of a conductive tab 120 may include a pair of side portions 123 and a bottom portion 124 connected to the side portions 123. The side portions 123 make smooth curves having a shape that matches shapes of corner portions of the batteries. The side portions 123 bent from the battery connecting part 121 and simultaneously formed in the opposite direction to be gradually distant from each other based on one vertex 123V. Also, the bottom portion 124 is bent from the oblique side portion 123 so as to be formed on a different surface level from the battery connecting part 121. Furthermore, the bottom portion 124 has an approximately triangle shape.

Figure 6:
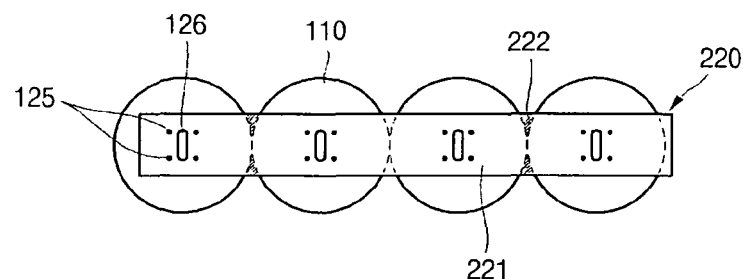
FIG. 6 is a front view of a state where a conductive tab according to another embodiment of the present invention is connected to a cylindrical type battery.

In addition, the side portion 123 may have almost the same radius of curvature as that of the corner portions of the secondary battery 110. Accordingly, the side portion 123 of the bending part 122 can be disposed as if it covers the surface of the secondary battery 110. The bottom portion 124 is positioned in the boundary region between the secondary batteries 110. FIG. 6 is a front view of a state where a conductive tab according to another embodiment of the present invention is connected to a cylindrical type battery. Herein, a hatched section is a bending part 222 formed in a battery connecting part 221 of a conductive tab 220.

As shown in FIG. 6, it is not necessary for the bending part 222 to be formed in every gaps or boundaries between secondary batteries 110. In other words, the bending part 222 may be formed in gaps or boundaries between only several secondary batteries 110. Even if the bending part 222 is formed in gaps or boundaries between only several secondary batteries 110, the conductive tab 220 can be safely fixed at a predetermined position of the secondary battery 110.

Figure 7:
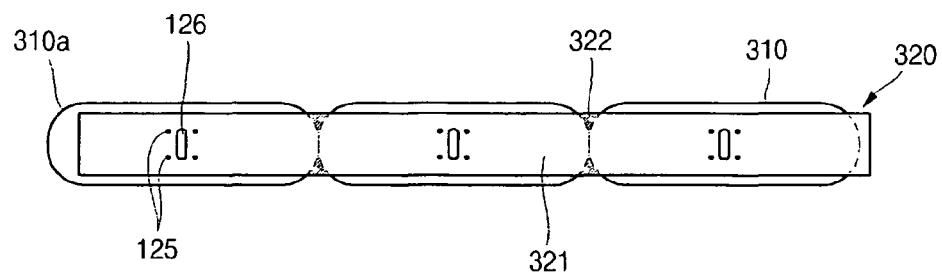
FIG. 7 is a front view of a state where a conductive tab according to the present invention is connected to a square type battery.

FIG. 7 is a front view of a state where a conductive tab according to the present invention is connected to a square type battery.

As shown in FIG. 7, a conductive tab 320 according to the present invention can be applied to not only a cylindrical type battery but also a square type battery 310 as a secondary battery. The square type battery 310 also has a curved surface 310a formed in the side portion thereof so as to have a predetermined radius of curvature. Thus, a bending part 322 formed in a battery connecting part 321 of the conductive tab 320 is coupled to between the curved surface 310a and the curved surface 310a of the square type batteries 310.

Figure 8A:
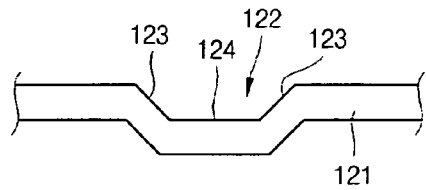
FIG. 8a to 8c are sectional views showing various types of bending parts formed on the conductive tab according to the present invention.
Figure 8B:
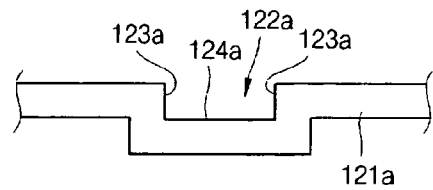
Figure 8C:
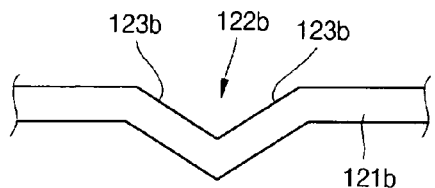

FIGS. 8a to 8c are sectional views of various types of bending parts formed on the conductive tab according to the present invention.

As shown FIG. 8a, a bending part 122 may be comprised of an side portion 123 that is obliquely connected to a battery connecting part 121, and a bottom portion 124 connecting the two oblique side portions 123. Herein, the side portion 123 is slightly slanted. In other words, the side portion 123 may be formed in a nearly acute angle with the battery connecting part 121. Herein, the bottom portion 124 is formed in almost parallel with the battery connecting part 121, but can be included from the battery connecting part 121.

As shown in FIG. 8b, another bending part 122a may be comprised of a side portion 123a bent in an approximately perpendicular direction to a battery connecting part 121a, and a bottom portion 124a connecting the two side portions 123a. Herein, the bottom portion 124a is formed in almost parallel with battery connecting part 121a, but can be included from the battery connecting part 121. As shown in FIG. 8c, another bending part 122b may be formed of only an side portion 123b bent in an acute angle with a battery connecting part 121b. In other words, the two oblique side portions 123b are directly connected to each other without a bottom portion connecting the two oblique side portions 123b.

Accordingly, various types of bending parts can be formed in the conductive tab according to the present invention. Of course, other types not shown in the drawings are also possible. However, all of the bending parts should protrude from one side portion of the battery connecting part in a predetermined length or depth. As a result, the connecting part can be safely coupled to the gaps or boundary regions between the secondary batteries.

Figure 9:
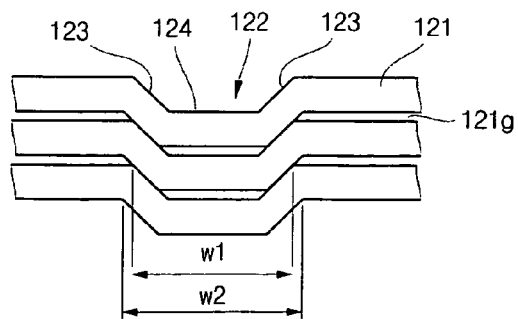
FIG. 9 is a partial sectional view of a laminated state of the conductive tab according to the present invention.

FIG. 9 is a partial sectional view of a laminated state of the conductive tab according to the present invention.

As shown in FIG. 9, a bending part 122 with a predetermined depth is formed in a battery connecting part 121 of a conductive tab 120, so that gaps 121g with a predetermined height is formed between conductive tabs 120 laminated. To this end, it is desirable that the width W1 of the bend part 122 formed on the upper surface of the conductive tab 120 is slightly smaller than the width W2 of the bend part 122 formed on the lower surface thereof. In other words, if the width W1 of the upper surface is the same as or larger than the width W2 of the lower surface, when another conductive tab 120 is laminated on the upper surface, a plurality of conductive tabs can strongly adhere to each other by residual oil or moisture used for the manufacturing process. As a result, the gap 121g is not formed between the conductive tabs 120. However, if the width W1 of the upper surface of the bending part is smaller than the width W2 of the lower surface according to the present invention, the gap 121g is naturally formed between the conductive tabs 120, thereby preventing a plurality of conductive tabs 120 from strongly adhering to each other.

Figure 10A:
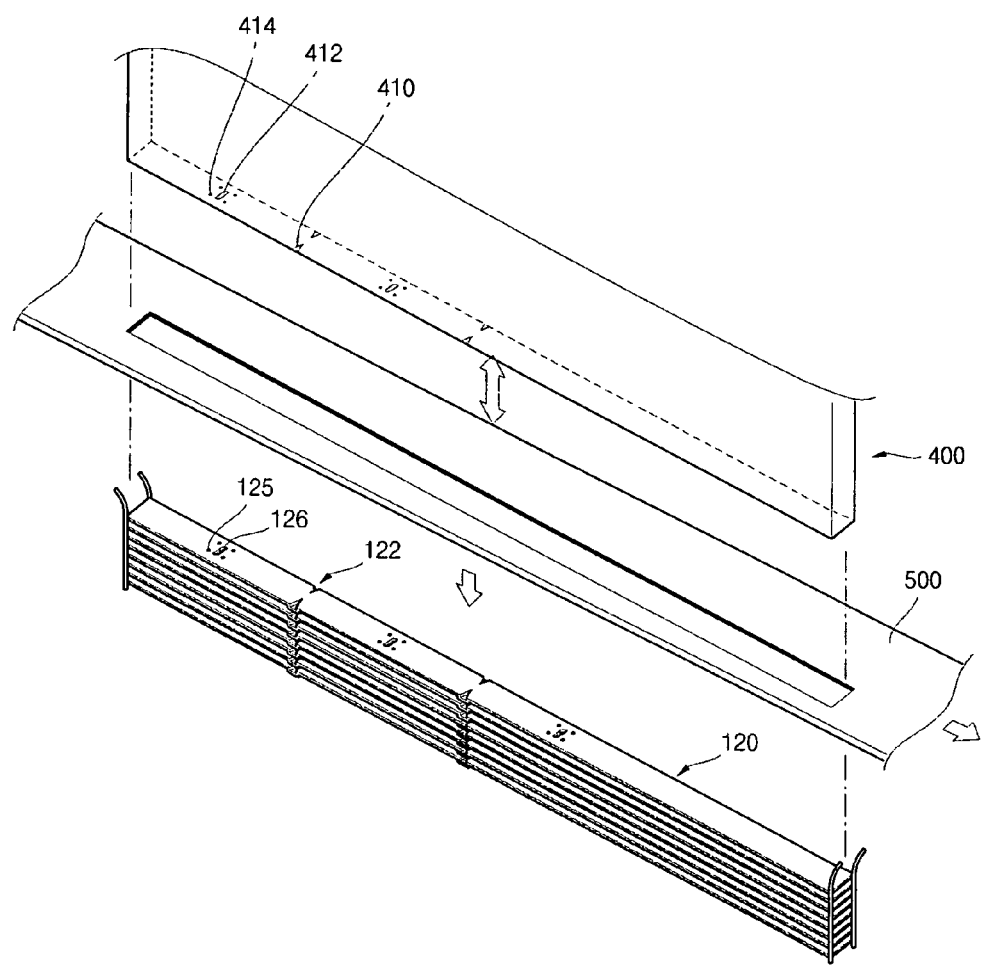
FIG. 10a is a perspective view of a step of manufacturing a conductive tab.
Figure 10B:
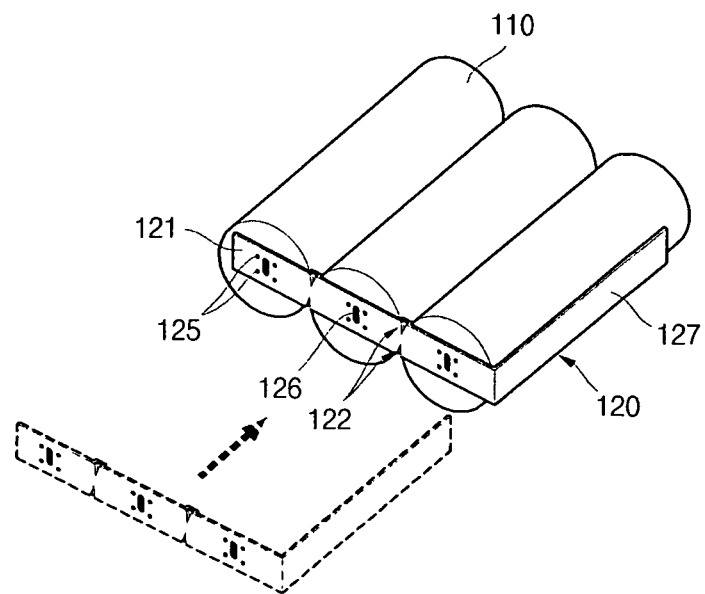
FIG. 10b is a perspective view of a step of temporarily coupling the conductive tab to the secondary battery.
Figure 10C:
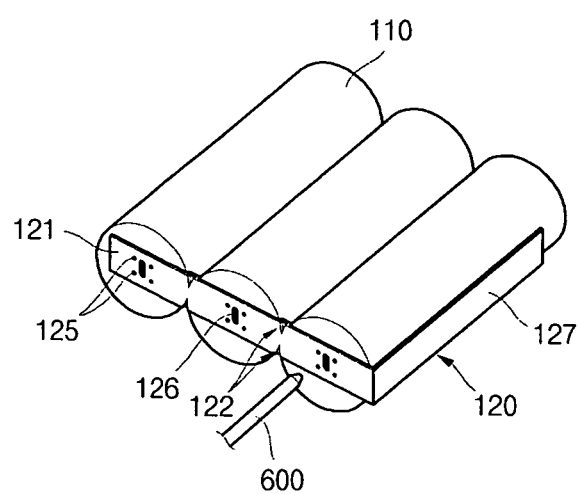
FIG. 10c is a perspective view of a step of welding the conductive tab to the secondary battery.
Figure 10D:
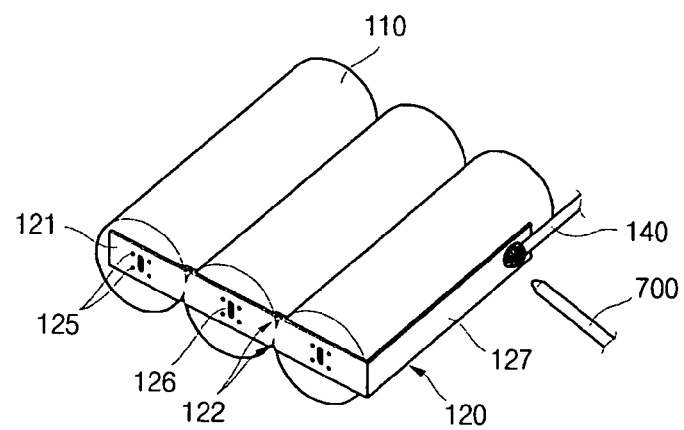
FIG. 10d is a perspective view of a step of soldering a wire to the conductive tab.

FIG. 10a is a perspective view showing a step of manufacturing a conductive tab, FIG. 10b is a perspective view showing a step of temporarily coupling the conductive tab to a secondary battery, FIG. 10c is a perspective view of a step of welding the conductive tab to a secondary battery, and FIG. 10d is a perspective view of a step of soldering a wire to the conductive tab.

As shown in FIG. 10a, in the step of manufacturing a conductive tab, each conductive tab 120 is manufactured by blanking an original plate 500 with a punch 400. At this time, the conductive tabs 120 dropping downward are successively laminated. A plurality of protrusions 410 are formed in the punch 400, so that a bending part 122 is naturally formed at a predetermined position of the conductive tab 120. As mentioned above, the bending part 122 is a region to be coupled to gaps or boundaries between secondary batteries. As a bending part 122 is formed in the conductive tab 120, the conductive tab 120 does not strongly adhere to the upper and lower direction. Accordingly, when each conductive tab 120 is extracted for the welding process, it is not extracted in a state where conductive tabs closely adhere to each other. In addition, after the blanking process, the conductive tab 120 is bent at a predetermined position, so that it can be divided into a battery connecting part and a wire connecting part. The numeral "412" and "414" in FIG. 10a, are protrusions formed in the punch 400 so as to form a connection hole 125 and a long hole 126.

As shown in FIG. 10b, in the step of temporarily coupling a conductive tab, the conductive tab 120 having a bending part 122 is coupled and temporarily fixed to gaps between a secondary battery 110 and a secondary battery 110. In other words, a plurality of secondary batteries 110 are disposed on the same plane and closely adhere to each other. Then, the bending part 122 formed in the battery connecting part 121 of the conductive tab 120 is coupled to the gaps between the secondary batteries 110, so that the conductive tab 120 is temporarily fixed to the secondary battery 110.

As shown in FIG. 10c, in the step of welding a conductive tab, the battery connecting part 121 of the conductive tab 120 is welded and fixed on the surface of the secondary battery 110 by using a welding rod 600. In other words, the connection hole 125 of the battery connecting part 121 is welded by the welding rod, so that the battery connecting part 121 is connected to the surface of the second battery. General resistance welding method or laser welding method and the like can be used for the welding process, but not limited to thereto.

As shown in FIG. 10d, in the step of soldering a conductive tab, a wire 140 is soldered to the wire connecting part 127 of the conductive tab 120 by using a soldering rod 700. The wire connecting part 127 is bent along the side portion of the secondary battery 110 in FIG. 10d, but it is also possible that the wire connecting part 127 is bent to the upper portion direction of the second battery 110.

As described above, after the conductive tab 120 according to the present invention is manufactured, welded and soldered, the wire 140 is electrically connected to the protective circuit module, and then a pack process is successively proceed.

While the present invention has been particularly shown and described with reference to exemplary embodiments thereof for a conductive tab according to the present invention and a battery pack having the same, it is not limited to the exemplary embodiments and it will be understood by those skilled in the art that various changes in form and details may be made therein without departing from the spirit and scope of the invention as defined by the appended claims.

What is claimed is:

1. A conductive tab comprising:
    a battery connecting part having a surface contacting a plurality of secondary batteries;
    a wire connecting part extended from the battery connecting part, and connected to a wire; and
    at least one bending part formed in the battery connecting part, the bending part being coupled to the secondary batteries to guide the positions of the secondary batteries, the at least one bending part including a bottom portion forming a recess indented by a predetermined depth from the surface of the battery connecting part, the bottom portion disposed in a gap between the secondary batteries.

2. The conductive tab according to claim 1, wherein the bending part is disposed in a gap between the secondary batteries.

3. The conductive tab according to claim 1, wherein one bending part is formed in an upper portion of the battery connecting part, and another bending part is symmetrically formed in a lower portion of the battery connecting part.

4. The conductive tab according to claim 1, wherein the bending part comprises:

a side portion connecting the bottom portion to the battery connecting part.

5. The conductive tab according to claim 4, wherein the battery connecting part and the bottom portion are formed on different surface levels from each other.

6. The conductive tab according to claim 4, wherein the side portion is obliquely connected, with respect to the surface of the battery connecting part, to the battery connecting part.

7. The conductive tab according to claim 4, wherein the side portion is connected to the battery connecting part substantially at a right angle from the surface of the battery connecting part.

8. The conductive tab according to claim 4, wherein the side portion has a shape that matches a shape of a corner portion of one of the secondary batteries.

9. The conductive tab according to claim 4, wherein the bending part comprises another side portion connecting the bottom portion to the battery connecting part, the another side portion contacting the side portion at a vertex in a manner that an angle of the vertex is formed parallel to the surface of the battery connecting part.

10. The conductive tab according to claim 1, wherein at least one connection hole is formed on the battery connecting part in the corresponding region to the secondary battery.

11. The conductive tab according to claim 10, wherein the battery connecting part and the secondary battery are welded to each other via the connection hole.

12. The conductive tab according to claim 1, wherein at least one wide hole is formed on the battery connecting part in the corresponding region to the secondary battery so as to alleviate a thermal expansion phenomenon during the connecting process.

13. The conductive tab according to claim 1, wherein the secondary batteries connected to the battery connecting part include a cylindrical type battery or a square type battery.

14. A battery pack including a conductive tab described in claim 1.

15. A battery pack comprising:
 a plurality of secondary batteries;
 a conductive tab including:
  a battery connecting part having a surface contacting the secondary batteries;
  a wire connecting part extended from the battery connecting part and connected to a wire; and
  a bending part formed in the battery connecting part, the bending part being coupled to the secondary batteries to guide the positions of the secondary batteries, the bending part including a bottom portion forming a recess indented by a predetermined depth from the surface of the battery connecting part, the bottom portion disposed in a gap between the secondary batteries;
 a protective circuit module electrically connected to the wire; and
 a case receiving the secondary batteries, the conductive tab, the wire, and the protective circuit module.

* * * * *